Patented Dec. 16, 1941

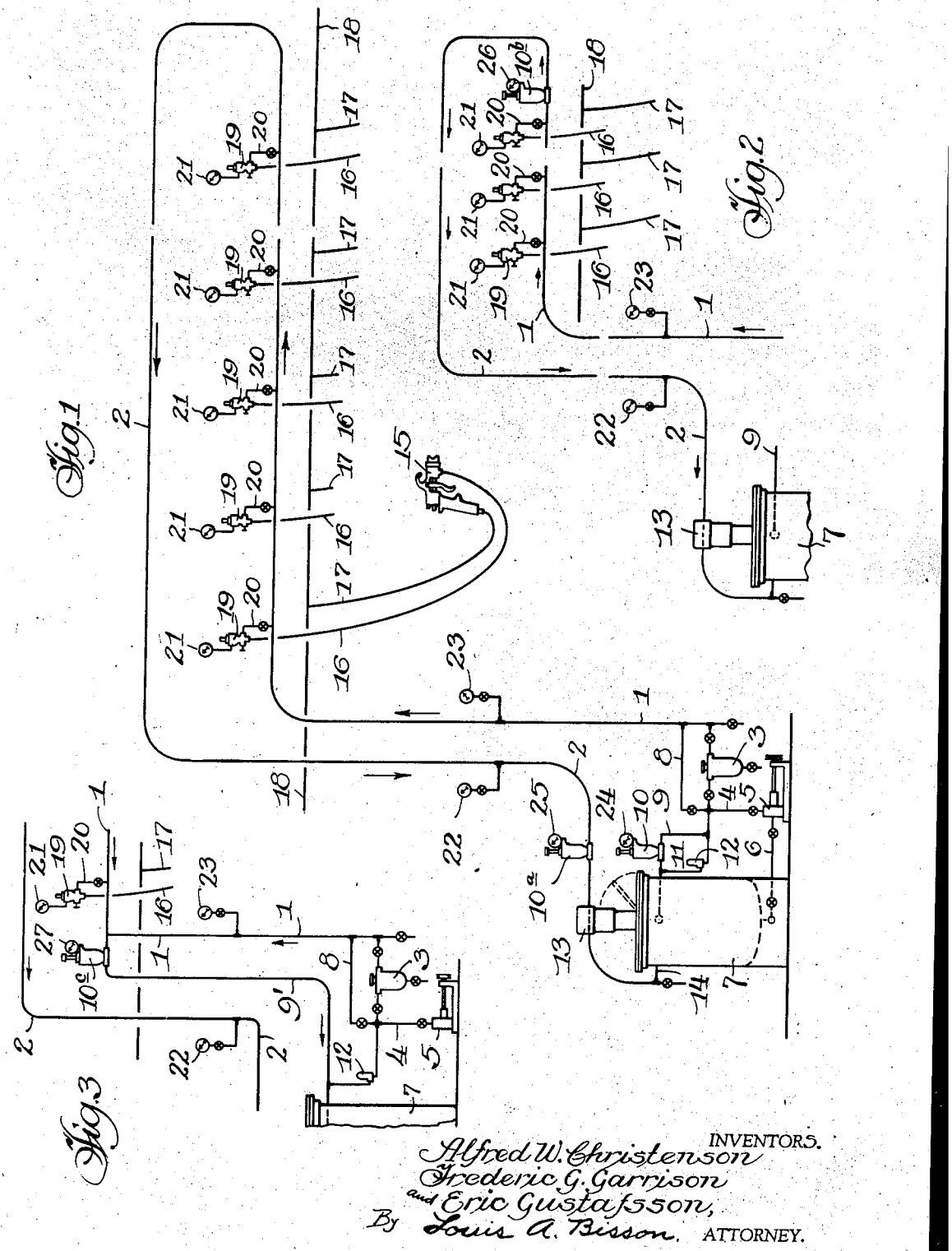

2,266,354

UNITED STATES PATENT OFFICE 2,266,354

LIQUID MATERIAL SUPPLY SYSTEM

Alfred W. Christenson, Detroit, and Frederic G. Garrison, Birmingham, Mich., and Eric Gustafsson, Chicago, Ill., assignors to Binks Manufacturing Company, Chicago, Ill., a corporation of Delaware Application March 22, 1939, Serial No. 263,338

3 Claims. (Cl. 91—45)

The present invention relates to systems for distributing fluidal material including various coating materials, such as paints, enamels, lacquers, or the like, and has reference more particularly to a system of the circulating type.

Coating materials are supplied under pressure through pipe lines extending along stations where the material is applied to the objects to be coated at the stations, as by means of spray guns, there being a pipe line for each character of material, and a spray gun at each station for each pipe line. The spray guns are connected to the pipe lines at the stations by supply ducts, such as hoses. As the guns are opened and closed, the demand for the material is accordingly varied and there is generally, in the usual circuit, also a variation of pressure of the material in the line.

The present invention comprehends the provision of a novel means for, as well as a novel method of, supplying or feeding the material to the line in accordance with the demand made by the guns and also constantly maintaining the predetermined pressure of the material in the line so that the spraying by any gun will be unaffected by the opening and closing of other guns connected in the same line, the spraying being always proper and as desired.

These objects are accomplished by including in the circuit, as at the end of the main or supply portion of the circuit and just after the last gun on the line, or at the end of the return circuit portion, an adjustable, automatic regulating or modulating valve, so that such valve may act upon any tendency to change of pressure in the line to counteract it and immediately effect the necessary flow of material to the line in accordance with the demand made by the guns. The circuit includes a feed-back circuit in which such a valve is connected. This valve so controls the flow in the feed-back as to either throttle such flow or to permit greater flow of material in accordance with the tendency to decrease or increase of pressure, respectively, of the material in the feed or supply line. When such a valve is used in the return line, it acts likewise to effect its counteracting action by way of the return portion of the line or circuit.

Other objects, advantages, capabilities, features, process steps, and the like, are comprehended by the invention as will later appear and as are inherently possessed by the invention.

Referring to the drawing:

Fig. 1 is a diagrammatic showing of a circulating, distributing system constructed in accordance with the invention;

Fig. 2 is a similar fragmentary showing of an alternative form; and

Fig. 3 is a similar fragmentary showing of an alternative feed back arrangement.

Referring more in detail to the drawing, the embodiments chosen to illustrate the invention in more or less diagrammatic form on the drawing are shown as comprising a feed or supply pipe line or circuit portion 1 and a return pipe line or circuit portion 2. The line 1 is connected by way of a suitable filter 3 and a pump discharge main 4 to a suitably operated pump 5, an intake 6 to the pump being connected to the lower end of a material container 7. A by-pass pipe 8 may be connected to the pump discharge pipe 4 and the feed line 1 to by-pass the material whenever it is necessary to clean the filter.

From the pump discharge 4 runs a feed-back pipe 9 by way of a modulating or regulating valve 10 to and into the upper part of the container or tank 7, for the feed-back of the material in excess of that needed in the main line 1, the valve 10 being so adjusted as to maintain a given pressure in the main line 1. This valve is of the known adjustable automatic type wherein when the pressure rises on the inlet side of the valve the latter automatically opens to permit the passage of more material therethrough and to thus cause a reduction of the excessive pressure, and when the pressure on the inlet side of the valve drops below the point for which the valve was adjusted it will then throttle the flow of material through it to effect an increase in pressure toward and to the predetermined point for which the valve was set.

There is also connected in shunt with the feed-back 9 a relief circuit 11 with a suitable relief valve 12 between the pump discharge 4 and the tank 7 so that, should the pressure increase to an unsafe point, the material will be released to the tank 7 by the opening of the relief valve 12.

The container or tank 7 has a suitable agitator (not shown) operated by a suitable motor 13 on the container for constantly maintaining the material in homogeneous condition. The return line 2 is connected by way of a valved pipe 14 to the upper part of the tank 7, and may have a modulating or regulating valve 10a of the same kind as valve 10 in the feed-back 9. This valve 10a is so connected in the return line as to open when there is an increase of pressure in the return line on the inlet side of the valve above a predetermined point for which the valve was set, to allow more material to pass to the tank and thus decrease the excess pressure, and to throttle the flow of material when the pressure in the return line on the inlet side of the valve decreases below the point for which the valve was set, so as to build up or bring back the pressure to the predetermined point. The valve 10a functions to automatically maintain a given back pressure in the return line 2.

In the form shown in Fig. 2, in lieu of having the modulating or regulating valve 10ᵃ at the end of the return portion 2 of the circuit, such valve 10ᵇ may be located at the end of the supply portion of the circuit, preferably just after the last gun on the line 1. Thus valve 10ᵇ functions to automatically maintain a given pressure in the line 1.

In either case, or in both cases (Figs. 1 and 2), the pressure in line 1 is maintained by reason of having the regulating valves at both ends, so to speak, of the supply line, that is, valves 10 and 10ᵃ, or valves 10 and 10ᵇ, whereby the pressure of the material in the line or circuit between such valves is maintained uniform.

While the valve 10 in Fig. 1 is shown in a feed-back 9 close to the tank for convenience of regulation in the pump room, this valve 10ᶜ may be located, as shown in Fig. 3, to the line 1 just ahead of the series of spray appliances or guns. In this case the discharge side of the valve 10ᶜ is connected by a duct 9' which leads back to the tank 7 at the point where pipe 9 in Fig. 1 is connected. In this way, the modulating valves 10ᶜ and 10ᵇ are connected to the circuit 1—2 more closely to the series of guns than the valves 10 and 10ᵃ, and hence their effect upon the gun series supply portion of the circuit will be more direct. Nevertheless, the valves 10 and 10ᵃ are connected to both ends of the circuit although more remotely to the gun series portion thereof, and have their effect thereon in the same manner.

Along the feed line 1 of the circuit are connected any number of spray guns 15, a gun to each spraying station; and each gun is connected by a material supply duct 16, such as a hose, to the feed line 1 at a point corresponding to the spraying station of the gun. The gun is also connected by an air supply duct 17, such as a hose, to a pressure air supply main 18, also at a point corresponding with the spraying station. The duct 16 is connected to the feed line 1 by way of a pressure regulating or reducing valve 19 and a valved pipe connection 20. The valve 19 is of the known adjustable automatic pressure reducing type of valve, which when set for a given pressure on the outlet side of the valve functions to open or close with decrease or increase of pressure from the predetermined point on such outlet side of the valve, to bring the pressure back to the given point. A suitable gauge 21 is connected to each valve 19 to indicate the pressure on the outlet side of the valve. Suitable gauges 23 and 22 are respectively connected to the feed line 1 and return line 2 to indicate the pressures therein. Suitable gauges 24, 25, 26 and 27 are connected to the inlet side of the modulating valves 10, 10ᵃ, 10ᵇ, and 10ᶜ to indicate the pressures on such side of the valves. Suitable valves, such as hand operated valves, are connected at various points of the system and are shown according to well known convention.

By the present invention the material is supplied or fed in accordance with the demand made at the guns, and the desired pressure in the feed line 1 is maintained constant, while at the same time there is a circulation of the material in the circuit 1—2, and in the feed-back 9. The amount so circulating or feeding back will be generally inversely with the demand.

The material is fed from the pump 5 at a given pressure, such as, for example, 110 pounds in the pump discharge. The main portion of the material is fed to the line 1, and part is fed back to the tank 7 by way of the feed-back circuit 9. The modulating valve is so adjusted and set as to maintain a given pressure in the feed line, such as, for example, 50 pounds at the last take-off or gun at the end of the line 1. The valves 19 are so adjusted and set as to maintain a given pressure at the guns whether spraying or not spraying and regardless of the pressure in the line 1 and at the inlet sides of the valves 19. The pressure for which the valves 19 are set may be, by way of example, 30 pounds. The modulating valve 10ᵃ in the return line is so adjusted and set as to effect that back pressure in the return line as to assist in maintaining the predetermined pressure in the feed line 1. By way of example, the valve 10ᵃ may be set for 10 pounds pressure at the inlet side of the valve. When valve 10ᵇ is used (see Fig. 2) at the end of the supply line 1, it is so adjusted and set as to effect that pressure in the line 1 as to maintain it at the desired value, such as 50 pounds, at the last gun of the series. Under such conditions, the pressure in the valve 10ᵇ may be 55 pounds. These values are given only as examples. The adjusting and setting depend upon the desired pressure to be maintained in the line 1.

In operation when any gun is opened to spray there is a tendency to a drop of pressure in the hose 16. Immediately the valve 19 acts to counteract such tendency and to permit the passing through of the required material to the gun. This is immediately effective through the line to the modulating valves 10 and 10ᵃ or 10ᵇ. The valve 10 immediately acts to throttle the flow of material in the feed-back 9 so that such material, which would otherwise be fed back to the tank 7, is fed to the line 1 to meet the demand made by opening the gun and also to maintain the given pressure in the line 1. The tendency to drop in pressure in the line 1 is effective directly in the valve 10ᵇ or indirectly through the return 2 in the valve 10ᵃ. In either case, the valve 10ᵇ or 10ᵃ immediately acts to throttle the flow of material to or through the return line 2, and maintains the given or desired pressure in line 1. The same results occur when more guns are opened regardless of the number.

When any gun is closed, there is a tendency toward an increase of pressure in the hose 16, in line 1 and in line 2. Immediately the valves 10 and 10ᵃ or 10ᵇ act to open so as to let more material flow to the tank 7 by way of the feed back 9 and the return line 2 connected to the tank, thus counteracting such tendency at both ends of line 1, so to speak. The valve 19 also acts to reduce or stop the flow to hose 16 but to maintain in hose 16 the desired pressure on the material so that when the gun is opened the material will be at the proper pressure for spraying.

The system is very sensitive and operates instantaneously so that there is a constant maintaining of the desired and predetermined pressures, especially in the line 1. Also, the feed of the material to line 1 is only in accordance with the demand made at the guns. Hence, there is much less feeding of material than in previous circulating systems, while at the same time the proper pressure is maintained in the feed line.

There is a trend in paint circulating and distributing systems to use higher viscosity coating materials than heretofore, longer pipe lines, and more heavily loaded lines. It becomes important in view of such conditions to reduce pump pressures for the purposes of saving power, and of reducing pump maintenance cost.

The practice of throttling at the return end of a circulating line by a hand operated gate valve, or the like, for building up sufficient pressure at the locus where the regulating valve for the last gun of the series is connected to the line, is satisfactory only so long as the coating material drawn off by the guns is slight in comparison with the total volume being circulated in the main line. Under such conditions, the variation in the volume of the liquid passing through the throttling valve, at any given opening, is not great, so that the variation in pressure of the fluid at the locus referred to is correspondingly slight. Likewise, there is but a small variation in the line pressure drop between the regulating valve for the last gun mentioned and the return end of the circuit, and, hence, the total variation in pressure in the line is small enough to be negligible.

In large installations having long lines, such as 2,000 to 3,000 feet long, and having a large number of guns connected thereto, such guns, when all open, will impose a large demand on the supply of material in the line, such as fifty per cent (50%) or more of the paint or other coating material supplied by the pump. This means in the usual system a very great variation in pressure of the material in the main line between the no-load condition, when all the guns are closed, and the full-load condition, when all the guns are open.

The present invention eliminates or prevents such variables, by so placing automatically operating regulating or modulating valves at such points in the circuit as to be immediately effective at both ends of the supply line for maintaining a constant or uniform pressure of material in the line regardless of the variation in load, the volume of material supplied by the pump to the feed line being proportionate to the demand made by the guns.

Preferably the regulating valve in the circulating main line is placed just after the last gun of the series so that it will act directly upon that portion of the circuit where the guns are connected, but such valve may be connected to the circuit at the end of the return line. In the latter case, the control is more indirect, by way of the return line, and must be so adjusted as to compensate for such variations as might arise from the friction of the liquid in the return circuit portion, and possibly other factors.

By experiments and trials, a system in accordance with the present invention will operate with a pump pressure not exceeding 110 pounds, while maintaining a pressure of 55 pounds at the valve 10$^b$, and a pressure at the guns of 30 pounds, under all load conditions. In other systems not using the present invention, the pump pressure varied between 101 and 165 pounds while the pressure in the line at the last gun of the series under full load condition fell to 22 pounds. The present invention accordingly effects a great saving in pump wear and power consumption.

While we have herein described and upon the drawing shown a few illustrative embodiments of the invention, it is to be understood that the invention is not limited thereto but comprehends other constructions, arrangements of parts, details, features, and the like without departing from the spirit of the invention.

Having thus disclosed the invention we claim:

1. A fluid material supply system comprising a circuit including a source of supply and means connected thereto for forcing material continuously through the circuit, said circuit including a supply circuit portion and a return circuit portion, material applying appliances connected to said supply circuit portion, pressure reducing valves connected thereto and responsive to the pressure of the material at the appliances to control the supply of material from said supply circuit portion to the appliances, a feed-back means connected to an end of said supply circuit portion and to said source of supply for continuously feeding back surplus material, said feed-back means including a modulating valve responsive to the pressure of material in said supply circuit portion for varying the feeding back of the surplus material in inverse proportion to the demand made by the appliances on the material from said supply circuit portion.

2. A fluid material supply system comprising a circuit including a source of supply and means connected thereto for forcing material continuously through the circuit, said circuit including a supply circuit portion and a return circuit portion, material applying appliances connected to said supply circuit portion, pressure reducing valves connected thereto and responsive to the pressure of the material at the appliances to control the supply of material from said supply circuit portion to the appliances, a feed-back means connected to an end of said supply circuit portion and to said source of supply for continuously feeding back surplus material, said feed-back means including a modulating valve responsive to the pressure of material in said supply circuit portion for varying the feeding back of the surplus material in inverse proportion to the demand made by the appliances on the material from said supply circuit portion, and a modulating valve connected to the other end of said supply circuit portion and to said return circuit portion for varying the continuous feeding back of surplus material by way of said return circuit portion to said source of supply in inverse proportion to the demand made by the appliances on the material from said supply circuit portion.

3. A fluid material supply system comprising a circuit including a source of supply and means connected thereto for forcing material continuously through the circuit, said circuit including a supply circuit portion and a return circuit portion, material applying appliances connected to said supply circuit portion, pressure reducing valves connected thereto and responsive to the pressure of the material at the appliances to control the supply of material from said supply circuit portion to the appliances, a feed-back means which includes said return circuit portion for continuously feeding back surplus material from an end of said supply circuit portion to said source and including a modulating valve responsive to the pressure of the material in said supply circuit portion for varying said continuous feeding back of the material by way of said return circuit portion to said source of supply in inverse proportion to the demand made by the appliances on the material from said supply circuit portion.

ALFRED W. CHRISTENSON.
FREDERIC G. GARRISON.
ERIC GUSTAFSSON.